Sept. 17, 1946.  A. L. MUNSON  2,407,676
WELDING MECHANISM
Filed Jan. 3, 1944  3 Sheets-Sheet 1
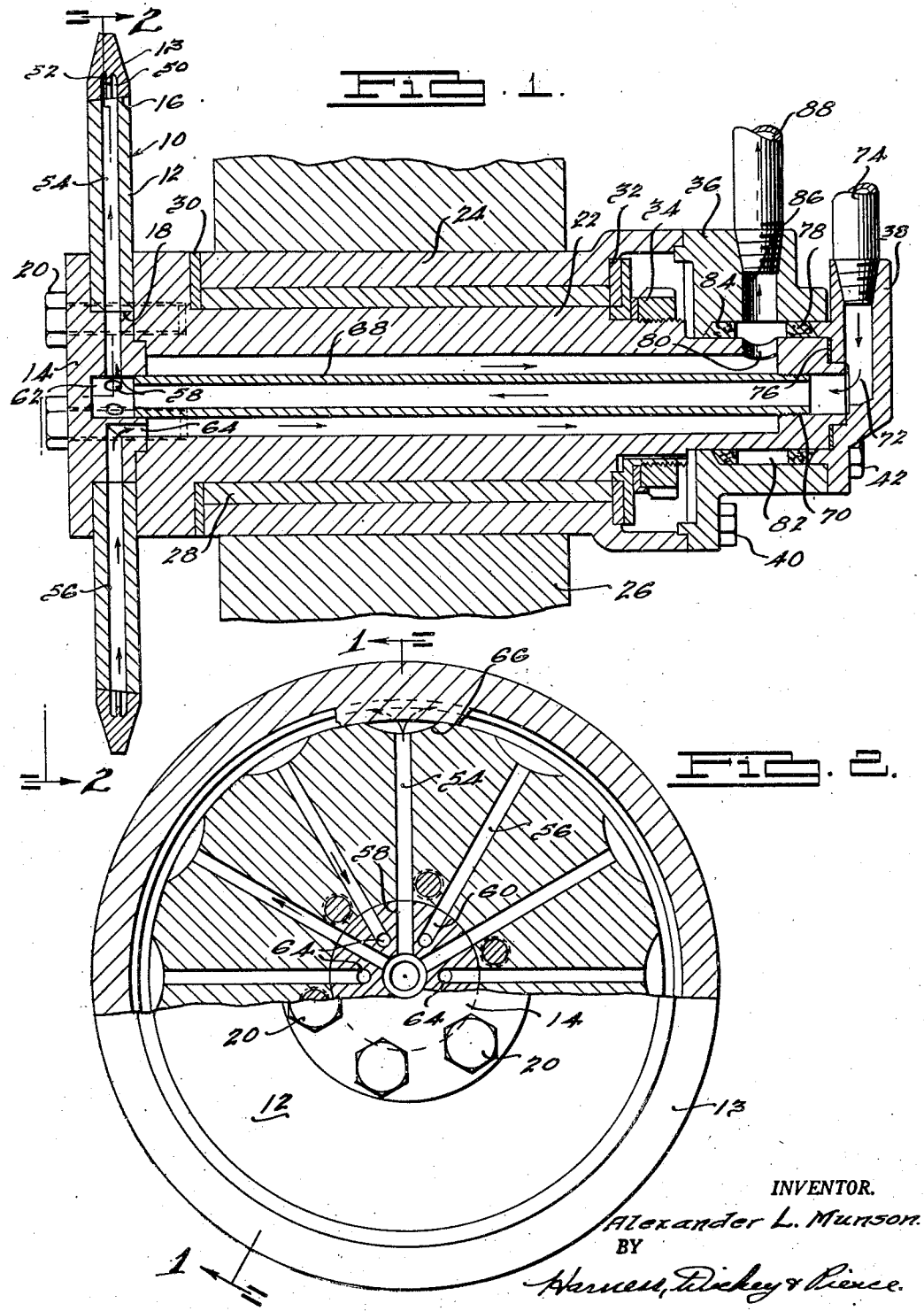
INVENTOR.
Alexander L. Munson.
BY
Harness, Dickey & Pierce.
ATTORNEYS.

Sept. 17, 1946.  A. L. MUNSON  2,407,676
WELDING MECHANISM
Filed Jan. 3, 1944  3 Sheets-Sheet 2
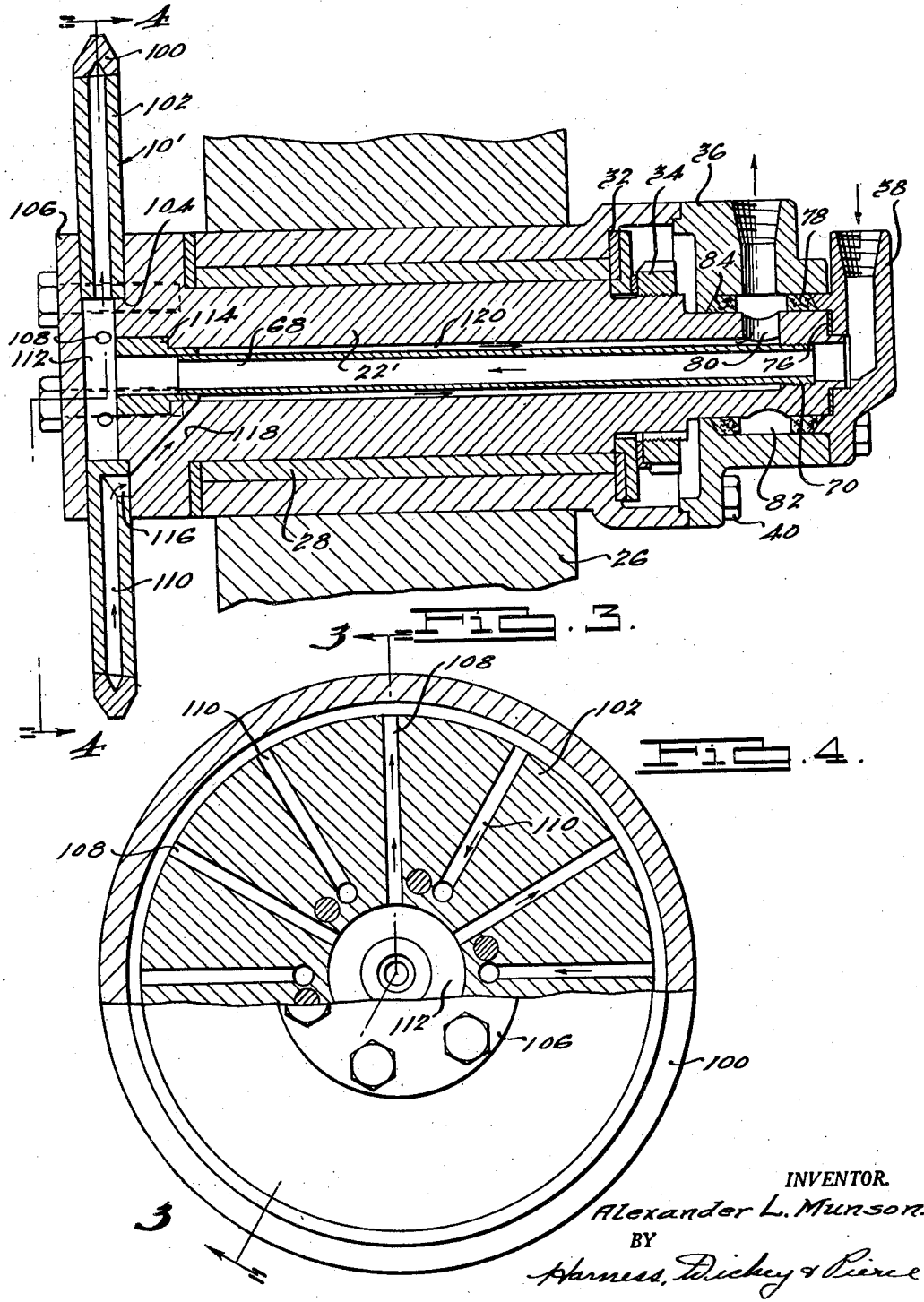
INVENTOR.
Alexander L. Munson.
BY
Harness, Dickey & Pierce.
ATTORNEYS.

Sept. 17, 1946.   A. L. MUNSON   2,407,676
WELDING MECHANISM
Filed Jan. 3, 1944   3 Sheets-Sheet 3
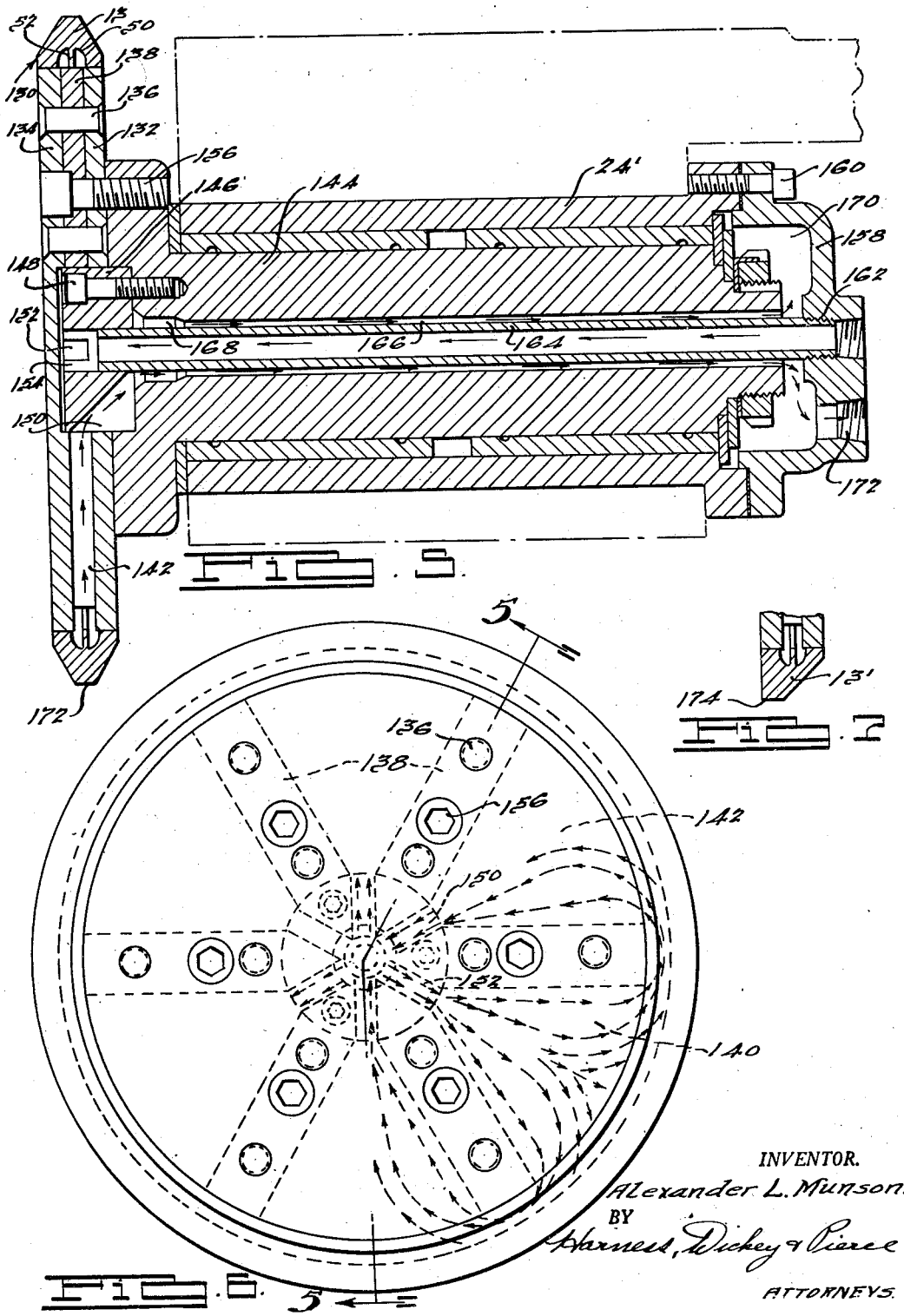
INVENTOR.
Alexander L. Munson.
BY
Harness, Dickey & Pierce
ATTORNEYS.

Patented Sept. 17, 1946

2,407,676

UNITED STATES PATENT OFFICE 2,407,676

WELDING MECHANISM

Alexander L. Munson, Detroit, Mich.

Application January 3, 1944, Serial No. 516,749

1 Claim. (Cl. 219—4)

The present invention relates to welding apparatus and in particular provides improved arrangements for cooling rotary electrodes, such as seam welder wheels.

The principal objects of the present invention are to provide constructions of the above type which may be economically and readily manufactured, and which are efficient and reliable in operation; to provide such constructions which generically include a rotatable electrode element provided with coolant passages, which enable circulation of coolant in the region immediately adjacent the work engaging rim of the wheel; to provide such constructions embodying separate rim and body portions and further embodying a coolant passage in the rim and supply and exhaust passages in the body; and to generally improve and simplify the arrangement of seam welder electrodes.

With the above as well as other objects in view, which appear in the following description and in the appended claim, preferred but illustrative embodiments of the invention are shown in the accompanying drawings, throughout which corresponding reference characters are used to designate corresponding parts and in which:

Figure 1 is a view in longitudinal section, taken along the line 1—1 of Fig. 2, of a seam welder wheel and its supporting assembly, embodying the invention;

Fig. 2 is a view, partly in vertical section, taken along the line 2—2 of Fig. 1;

Fig. 3 is a view in longitudinal section, taken along the line 3—3 of Fig. 4 of a modification;

Fig. 4 is a view, partly in vertical section, taken along the line 4—4 of Fig. 3;

Fig. 5 is a view in longitudinal section, taken along the line 5—5 of Fig. 6 of a further modification of the invention;

Fig. 6 is a view, partly in vertical section, taken along the line 6—6 of Fig. 5; and Fig. 7 is a fragmentary view of a further modification.

It will be appreciated from a complete understanding of the present invention that the improvements thereof may be embodied in various different constructions, adapted for a variety of different welding or other operations. The disclosure herein of specific embodiments of the invention is, therefore, to be regarded in an illustrative and not in a limiting sense.

Referring first to the embodiment of Figs. 1 and 2, the wheel 10 is formed in three parts, namely, a work engaging rim 13, the periphery whereof is shaped, as will be understood, to accommodate the work being welded; an annular body member 12 and a central closure member 14. The periphery of the body member 12 is slightly tapered, as indicated at 16, and the inner surface of the rim 13 is correspondingly tapered. These two members are disposed to be press-fitted together, in accordance with the usual practice in applying rims to wheel bodies. The central member 14 is provided with an annular boss 18, which is received in the central opening provided in the body member 12. A plurality of circumferentially distributed studs 20 pass through the members 12 and 14 and secure the wheel to the outer end of the rotatable spindle 22. In general, the connection between the spindle 22 and the wheel 10 should be electrically conductive to allow the welding current to be supplied to the wheel through the spindle. If desired, and without interrupting the just-mentioned conductive connection, suitable packing may be provided to seal the junctions between the members 12, 14 and 22.

The spindle 22 is conventionally rotatable within a fixed bearing 24, supported by a bracket 26, which may be conventionally associated with the welding machine. Preferably and as illustrated, bushings 28, 30 and 32 are associated with the radial and thrust bearing surfaces. End play of the members is prevented by a collar 34 threaded onto a reduced portion of the spindle 22.

The right-hand end of the bearing member 24 is provided with cooperating enclosing covers 36 and 38, cover 36 being secured in place over the end of the bearing 24 as by means of one or more studs 40, and cover 38 being similarly held in place on cover 36, as by studs, such as 42.

Considering now the coolant circuit of the present system, the work engaging rim 13 is provided with an annular groove 50, which extends entirely therearound and which defines a coolant passage. Preferably and to increase the heat transfer surface of this passage, an annular fin 52 projects radially inwardly from the base of the groove 50. This fin also preferably extends entirely around the rim 13. Coolant is supplied to and exhausted from the groove 50 through a plurality of radially extending inlet passages 54 and a corresponding plurality of discharge passages 56, provided in the body member 12, and which directly communicate with corresponding inlet and discharge passages 58 and 60 formed in the central member 14. The inlet passages 58 open into a recess or pocket 62 provided at the center of the member 14, and the exhaust passages 60 communicate, respectively, with lateral passages 64, which open through the inner face of the member 14. The outer ends of the passages 54 and 56 are countersunk, as indicated at 66, so as to facilitate the transfer of fluid between these passages and the annular passage 50.

The spindle 22 is tubular in form and receives a central tubular member 68, the left-hand end whereof is fitted into the central aperture in the member 14, and the right-hand end whereof is threaded into the reduced right-hand end of the spindle bore, as indicated at 70. It will be appreciated that the tube 68 is threaded into the spindle before the wheel is applied, and that in applying the wheel, the central member 14 is projected over the left-hand end of the tube. The right-hand end of the tube 68 communicates, through a passage 72 in the cover 38, with a coolant inlet line 74, and it will be understood that packing members, such as 76 and 78, may be utilized to prevent leakage between the spindle 22 and the cover 38.

The annular space which surrounds the tube 68 directly communicates with the previously mentioned openings 64, and also communicates at its right-hand end with a radial passage 80, which opens into an annular chamber space 82 defined between the previously mentioned packing member 78 and a cooperating packing member 84. The chamber 82 communicates through passage 86 with the coolant exhaust line 88.

From the foregoing, it will be appreciated that the spindle 22 and wheel 10 may be continuously or intermittently rotated so as to cause the wheel 10 to traverse the work to be welded, it being understood that wheel 10 may cooperate with a similar wheel, between which two wheels the work may be clamped in accordance with conventional practice. Coolant introduced through the line 74 flows through the tubular member 68 into the recess 62, from whence it is distributed through the connecting passages 58 and 54 to the annular groove 50 in the rim. The coolant stream passing through a particular passage 54 may be regarded as dividing into two streams, which flow in respectively opposite directions, as indicated by the arrows in Fig. 2. Coolant thus introduced into the groove 50 is discharged therefrom through the connecting passages 56, 60 and 64 and through the annular space surrounding the tube 68, passage 80, chamber 82 and passage 86 to the discharge line 88. Each stream passing through a particular passage 56 may be regarded as made up of two components derived respectively from the inlet passages 54 at either side of the discharge passage in question.

The modified embodiment of the invention shown in Figs. 3 and 4 may duplicate the arrangement of Figs. 1 and 2 with the following exceptions. In this case, the wheel 10′ comprises a rim 100 and an annular body portion 102, which members may be secured together in the previously described manner. The inner periphery of the annular member 102 is seated upon a shoulder 104 provided at the outer end of the spindle 22′ and is held in place thereon by a cover plate 106. The member 102 is provided with radially extending inlet passages 108 and radially extending outlet passages 110. The passages 108 open into the central aperture 112 in the member 102, which is in continuous communication with the central coolant tube 68. In this case, the left-hand end of the coolant tube 68 is supported in a collar 114, which is received in the outer and counterbored end of the spindle 22′.

The exhaust passages 110 communicate respectively with lateral passages 116, which open through the inner face of the member 102 and are disposed in registry with angularly directed passages 118 formed in the spindle. The angularly directed passages 118 open into the annular space 120 which surrounds the tube 68.

In the embodiment shown in Figs. 5 and 6, the wheel 130 is built up from a pair of spaced annular discs 132 and 134, which are secured together as by a plurality of rivets 136. Spacing between the plates is maintained by a plurality of radially extending members 138, which also serve to divide the interplate space into a plurality of segmentally shaped inlet passages 140 and a corresponding plurality of similarly shaped exhaust passages 142. The end of the spindle 144 is slightly counterbored to receive a distributor block 146, which is held in place thereon by a plurality of circumferentially distributed studs 148. The block 146 has a plurality of circumferentially spaced grooves 150 cut therein, which open through the periphery thereof and also open through the inner face thereof. At the periphery of the block 146, the grooves 150 directly communicate with the exhaust passages 142. Block 146 is also provided with a plurality of radially extending passages 152, which open into a central passage 154 formed in the block. At the periphery of the block 146, the passages 152 communicate with the inlet passages 140. It will be understood that the wheel 130 snugly fits over the surface of the distributor block 146, which consequently serves to isolate the inner ends of the passages 140 and 142 from each other. The wheel is held in proper position relative to the spindle 144 and the block 146 by means of a plurality of circumferentially distributed studs 156.

In this instance, the right-hand end of the spindle bearing 24′ is provided with a cover 158 secured in place thereon by circumferentially distributed studs 160. The cover 158 is provided with a central internally threaded opening 162, into which the right-hand end of the deflector tube 164 is threaded. The left-hand end of tube 164 is fitted into the central aperture in the distributor block 146. Opening 162 is adapted, as will be understood, for connection to a suitable coolant inlet line. The annular space 166, which surrounds the tube 164, opens at its left-hand end into a slightly enlarged chamber 168, which communicates with the previously-mentioned grooves 150. This annular space opens at its right-hand end into the chamber 170 defined by the cover 158 and the end of the spindle. Chamber 170 communicates through a suitable outlet 172 with a coolant exhaust line. It is believed to be evident that the embodiment of Figs. 5 and 6 functions in the manner previously described.

It will be understood, of course, that the peripheries of the work engaging rims may be suitably shaped to accommodate the work being welded, the work engaging surfaces 172 of the embodiments thus far described being centrally disposed relative to the body of the rim. In the illustrative alternative arrangement of Fig. 7, the rim is provided with a work engaging surface which is laterally offset. Other arrangements may, of course, be utilized.

Although only several specific embodiments of the invention have been described in detail, it will be appreciated that various further modifications in the form, number and arrangement of parts may be made without departing from the spirit and scope of the invention.

What is claimed is:

In a seam welder wheel, a body, a work engaging rim secured to the periphery of said body, said wheel having an annular coolant passage therein which is located adjacent the work engaging surface of the rim, and means for circulating coolant through said passage including a plurality of radially extending circumferentially distributed inflow passages and a corresponding plurality of radially extending circumferentially distributed outflow passages, said inflow and outflow passages opening into said annular passage in circumferentially alternate relation to each other.

ALEXANDER L. MUNSON.